Nov. 29, 1932.                J. A. BALL                1,889,030
           MULTICOLOR PHOTOGRAPHY WITH BI-PACKS
                      Filed June 14, 1930
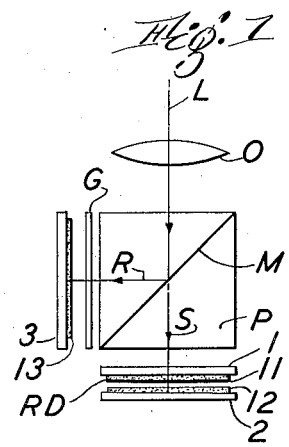
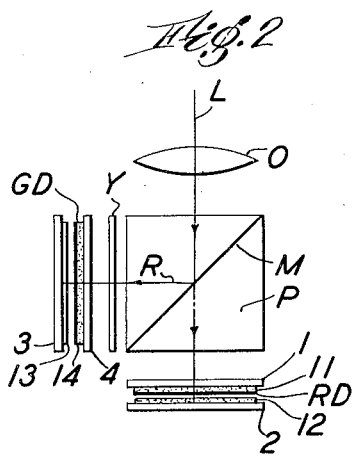
Inventor
Joseph A. Ball,
by Roberts, Cushman + Woodbury
his Attorneys Patented Nov. 29, 1932

1,889,030

UNITED STATES PATENT OFFICE

JOSEPH A. BALL, OF LOS ANGELES, CALIFORNIA, ASSIGNOR, BY MESNE ASSIGNMENTS, TO TECHNICOLOR, INC., OF NEW YORK, N. Y., A CORPORATION OF DELAWARE

MULTICOLOR PHOTOGRAPHY WITH BI-PACKS

Application filed June 14, 1930. Serial No. 461,061.

One of the many proposed solutions of the problems of color photography is the utilization of superimposed emulsions by using one incident light path (mono-packs, bi-packs and tri-packs). Another solution is the dividing of the incident light into as many divisions as color aspects are desired. Either of these solutions has certain disadvantages if the recording of more than two color aspects is required, these disadvantages being well known to those skilled in the art and consisting mainly in difficulties of obtaining proper registering, sharp definition and sufficient light intensity.

The present invention combines the advantages of the systems of color photography mentioned above and it is its main object to provide an arrangement whereby normal and identical emulsions can be used for the records for which this is desirable; which does not necessitate the use of special and abnormal emulsions; which permits color separation without special sensitizations; and which permits the incorporation of a key record without substantial changes of the three color system.

The subject matter of this invention is of the type in which the image-bearing beam is divided, by suitable light-dividing means, into two components, one of these components is used to expose two emulsions (of a bi-pack, e. g.) and the other component is used to expose at least one other emulsion. A characteristic feature of the invention consists in that one of said first two emulsions is like the third emulsion, preferably both panchromatic and cut from the same stock. By forming on these like emulsions the two images which contribute mainly to building up the gradation, or, in other words, supply the "body" or "substance" of the final picture (the gradations of the yellow positive being rather weak), and which must therefore be carefully balanced in exposure and development (e. g. the red and green records) the desired balance may be obtained uniformly and with facility. This can not be accomplished by recording the red and green aspects in the same light path for various reasons, chiefly because it has thus far been impossible to prepare a green-sensitive film satisfactory for bi-pack use in front of a red-sensitive film. But even if this could be accomplished the emulsion would have to be thin and relatively transparent and since its color selection must depend upon sensitization rather than filters, it would be radically different from the red-sensitive film and the two could not be properly balanced in exposure and development throughout varying conditions such as are encountered in cinematography.

Other objects of my invention will be apparent from the following explanation accompanied by a drawing in which:

Fig. 1 is a diagrammatic section showing an embodiment of the present invention; and Fig. 2 shows a modification of the present invention in the same manner as Fig. 1.

In order that the invention may be more easily understood a specific embodiment thereof will first be described. It is diagrammatically shown in Fig. 1, where O represents an optical system of any suitable construction, and P a light splitting device comprising a partly reflecting and partly transmitting surface M, which divides an incident light beam L into two divisions S and R as indicated by arrows. 1, 2 and 3 are suitable supports, for instance, cellulose films, bearing emulsions 11, 12 and 13. 11 is an ordinary silver bromide emulsion, blue sensitive only, requiring no special treatment and of a kind which can easily be obtained with the required thin and transparent characteristics as necessary for the front film of a bi-pack; 12 and 13 are panchromatic emulsions of usual characteristics. The heavy line RD represents a layer of dye, in this instance a surface layer of red filter dye which transmits only the range of radiation required for the red image to be recorded upon emulsion 12. G is an ordinary green filter inserted between the optical system and emulsion 13 and transmitting only the range of radiation required to record the green aspect upon emulsion 13. It is understood that film 3 and filter G can be placed in the direct rays and films 1 and 2 in the reflected rays.

In certain cases it becomes desirable to add to the three records of a three-color photographic process a fourth so-called key print, usually reproduced in gray or black which has the main purpose of giving definition to the colored picture and in certain cases to supply the deep shadows. My invention lends itself well for the production of colored pictures with key prints and a four-color system of this kind will now be described, referring especially to Fig. 2. O, P and M is again an optical system; 1, 2, 3, and 4 are supports, a fourth support, 4, having been added to 1, 2 and 3 of Fig. 1. Emulsion 14 upon support 4 may be a panchromatic emulsion which is thin and transparent enough to transmit as much light as possible to the back emulsion 13. A green surface dye GD is applied to emulsion 14, having the purpose of admitting to emulsion 13 only the radiations suited for recording thereon the green aspect, the surface dye filter GD replacing separate filter G of Fig. 1. Y is a yellow filter which absorbs radiations in the same manner as filters which are used with orthochromatic emulsions for ordinary black and white pictures.

Emulsions 11, 12 and 13 are of the same nature as the corresponding emulsions of Fig. 1; 12 and 13 being identical panchromatic emulsions, if possible slittings from the same stock, and 11 is an ordinary blue sensitive transparent emulsion. It is of course necessary that the key print be as definite in sharpness as possible and that the definition is preserved through the process. For this purpose it is desirable to print key positives by means of contact printing which does not cause loss of definition and does not build up graininess. With my arrangement, as shown in Fig. 2, it is possible to use contact printing in spite of the fact that the reflected image is reversed, because the key emulsion is exposed through the back, which compensates for the reversal of the image by reflection.

A further advantage of my arrangement arises from the fact that it is desirable to have for the purpose described key prints of a gamma of approximate unity and that the same gamma is desirable for photographic sound records which are now used with a large number of films. In making sound motion pictures the sound track is therefore printed together with the key print thereby making unnecessary any differentiation in the character of picture and sound records. The negative sound record (ordinarily made on a separate negative) may be printed on the positive film along with the aforesaid key pictures and this combined print developed to approximately gamma unity after which the film may be fixed, washed, dried and the color aspects applied by imbibition.

According to my method of recording the red and green aspects in different light paths, I am enabled to use substantially identical emulsions of a normal type for these two aspects, and require a special emulsion only for the blue aspect, this emulsion being special only in its transparency and in its surface coating. I am also enabled to balance, with uniformity and facility, the color values of the two records which are most important and most difficult to balance.

Still another advantage of having the red and green records on identical emulsions and therefore well balanced, arises from the fact that the human eye is much less sensitive to variations of blue and yellow light than to variations of red and green light. This circumstance is probably due to the fact that various sources of artificial light and also daylight vary a great deal in their blue components, that is to say, they vary from blue-white to yellow, depending upon whether they have a greater or less intensity of blue component than normal. Normal is usually taken to be noon sunlight in which case North skylight is considerably more blue; late afternoon sunlight is considerably more yellow; high intensity arc-light generally more blue; and incandescent light very much more yellow than normal. For this reason it does not matter very much if the blue and yellow records of a motion picture film are not particularly well balanced with respect to each other or with respect to the red and green records. However, the red and green records have to be well balanced as the eye is very sensitive to changes of these colors and irregularities of the relative values of red and green are therefore to be avoided. The arrangement of the present invention with identical emulsions for the red and green color aspects takes care of these facts in a simple manner and assures the proper balance of colors also with respect to this phenomenon.

I claim:

1. The method of making photographs in natural colors which comprises dividing an image-bearing beam of light in two component beams, recording one color aspect in one of said component beams upon a blue sensitive transparent emulsion, selectively filtering said component beam at the emergent side of said blue sensitive emulsion, recording another color aspect upon a panchromatic emulsion behind said blue sensitive emulsion, selectively filtering the other of said component beams and recording a third color aspect upon a second panchromatic emulsion which is substantially identical with the aforesaid panchromatic emulsion.

2. The method of making photographs in natural colors which comprises dividing an image-bearing beam of light in two component beams, recording one color aspect in one of said component beams upon a blue sensitive transparent emulsion exposed through its support, selectively filtering said component beam at the emergent side of said blue sensitive emulsion, recording another color aspect upon a panchromatic emulsion behind said blue sensitive emulsion, selectively filtering the other of said component beams and therewith recording a key print upon a second transparent emulsion exposed through its support, selectively filtering said other component beam at the emergent side of said transparent emulsion, and behind said second transparent emulsion, recording another color aspect upon a second panchromatic emulsion which is substantially identical with said first panchromatic emulsion.

3. The method of making photographs in natural colors which comprises dividing an image-bearing beam of light into a direct beam and a reflected beam, recording the blue color aspect upon a transparent blue sensitive emulsion in said direct beam, filtering said direct beam with a red filter behind said blue sensitive emulsion, recording the red color aspect upon a panchromatic emulsion behind said red filter, filtering said reflected beam in a yellow filter, recording a key print on a transparent emulsion behind said yellow filter, filtering said reflected beam with a green filter behind said transparent emulsion, and recording the green color aspect upon a panchromatic emulsion behind said green filter.

4. The method of making photographs in natural colors which comprises dividing an image-bearing beam of light into a direct beam and a reflected beam, recording the blue color aspect upon a transparent blue sensitive emulsion in said direct beam, filtering said direct beam with a red filter behind said blue sensitive emulsion, recording the red color aspect upon a panchromatic emulsion behind said red filter, recording a key print on a transparent emulsion in said reflected beam, filtering said reflected beam with a green filter behind said transparent emulsion and recording the green color aspect upon a panchromatic emulsion behind said green filter.

5. The method of making photographs in natural colors which comprises dividing an image-bearing beam of light into two component beams, recording the blue aspect of said image upon a blue sensitive transparent emulsion inserted in one of said component beams, recording with the aid of a filter a second color aspect upon a panchromatic emulsion behind said transparent emulsion, and recording in the second of said component beams with the aid of a filter a third color aspect upon an emulsion which is substantially identical with said first panchromatic emulsion.

6. The method of making photographs in natural colors which comprises dividing an image-bearing beam of light into component beams, recording images of different color aspects upon transparent emulsions in each of said component beams, and recording the red and green color aspects with the aid of filters on substantially identical emulsions behind said transparent emulsions respectively.

7. The method of making photographs in natural colors which comprises dividing an image-bearing beam of light into two component beams, recording the blue color aspect in one of said component beams upon a blue sensitive transparent emulsion, transmitting said component beam through a substantially red transparent filter at the emergent side of said transparent emulsion, recording the red color aspect upon a panchromatic emulsion behind said transparent emulsion, transmitting the other of said component beams through a substantially green transparent filter and recording the green color aspect upon a second panchromatic emulsion which is substantially identical with the aforesaid panchromatic emulsion.

8. The method of making photographs in natural colors which comprises dividing an image-bearing beam of light into two component beams, recording the blue aspect of the image upon a blue-sensitive transparent emulsion inserted in one of said component beams, recording with the aid of a filter the red color aspect upon a panchromatic emulsion behind said transparent emulsion, and recording in the second of said component beams with the aid of a filter the green color aspect upon an emulsion which is substantially identical with said first panchromatic emulsion.

Signed by me at Hollywood, California, this 5th day of June, 1930.

JOSEPH A. BALL.